April 11, 1961  R. A. KOBLE  2,979,378
PROCESSING OF URANIUM ORES

Filed Dec. 18, 1957  3 Sheets-Sheet 1

INVENTOR.
R.A. KOBLE

BY *Hudson & Young*

ATTORNEYS

United States Patent Office 2,979,378
Patented Apr. 11, 1961

2,979,378

PROCESSING OF URANIUM ORES

Robert A. Koble, Bartlesville, Okla., assignor to Phillips Petroleum Company, a corporation of Delaware Filed Dec. 18, 1957, Ser. No. 703,569

9 Claims. (Cl. 23—14.5)

This invention relates to the processing of uranium ores for uranium concentration. In another aspect this invention relates to a method of oxidizing uranium ores in a leaching process to improve the solubility of uranium compounds in the leach solution. In one of its more specific aspects this invention relates to a method of oxidizing uranium ores in a carbonate leach process for uranium concentration by hydrometallurgy.

Uranium ores containing about 0.2 to 0.4 percent uranium oxide ($U_3O_8$) are being processed by hydrometallurgy to obtain specification grade concentrates of at least 75 percent uranium oxide for the Atomic Energy Commission. These methods involve forming a soluble uranium compound, selectively dissolving the compound in a leach solution and subsequently separating the uranium component from the solution by one of several methods, such as ion exchange, solvent extraction, or selective precipitation. For quantitative dissolution of the uranium in the ore it is necessary that the uranium be in its hexavalent state. To insure this, oxidation of the ores during the leaching process is effected by passing air through the leach slurry. Air alone as an oxidant is unsatisfactory and chemical aids, such as potassium permanganate, are very expensive. Use of high pressure to increase the effectiveness of air as an oxidant is expensive because of initial equipment costs and maintenance. While oxidation is a necessary step in processing sub-hexavalent uranium ores with either acid or alkaline leach solutions, a satisfactory and practicable oxidation is particularly difficult in alkaline or carbonate leach processes. The oxidation problem is magnified when processing ores containing high amounts of tetravalent uranium, other oxidizable elements, such as sulfides, and oxidizable organic matter, such as asphaltic residue.

According to my invention uranium ores are effectively oxidized to the hexavalent state by contacting the leaching slurry with a gaseous mixture comprising oxygen and a substantial amount of ozone (at least about 1 volume percent of ozone in the mixture). The ozone-oxygen mixture can be provided and used with considerable savings over the use of potassium permanganate and air as the oxidant. An oxidation is readily effected which changes the valence state of the uranium to its more soluble form and frees uranium mechanically bound by organic matter. The ozone-oxygen stream which serves as the oxidant in the process of my invention can suitably be an oxygen stream which has been passed through an ozonator, or can be an air stream containing ozone which has been stripped from an adsorbent.

It is an object of my invention to provide an improved method for concentrating uranium from low grade uranium ore.

It is another object to provide a method of leaching uranium from uranium ore.

Still another object of my invention is to provide a method of increasing the solubility of uranium in a leach solution with an improved oxidation step.

A further object is to provide a method of supplying an improved oxidant which is suitable for oxidizing uranium ores in the carbonate leach process.

Other objects, advantages and features of my invention will be apparent to those skilled in the art from the following description and the drawing in which.

The hydrometallurgical concentration of uranium ores to uranium concentrate of greater than 75 percent $U_3O_8$ can follow any one of several courses, each of which begins by selectively dissolving uranium as a soluble compound or complex ion. Low grade ores can be upgraded by conventional mechanical methods, such as flotation; however, ores of relatively high uranium oxide content are now available and such a step is not necessary. The high grade ores having a content of about 0.2 to 0.6 weight percent of $U_3O_8$ are conditioned by crushing to small particle size prior to the leaching operation.

Figure 1:
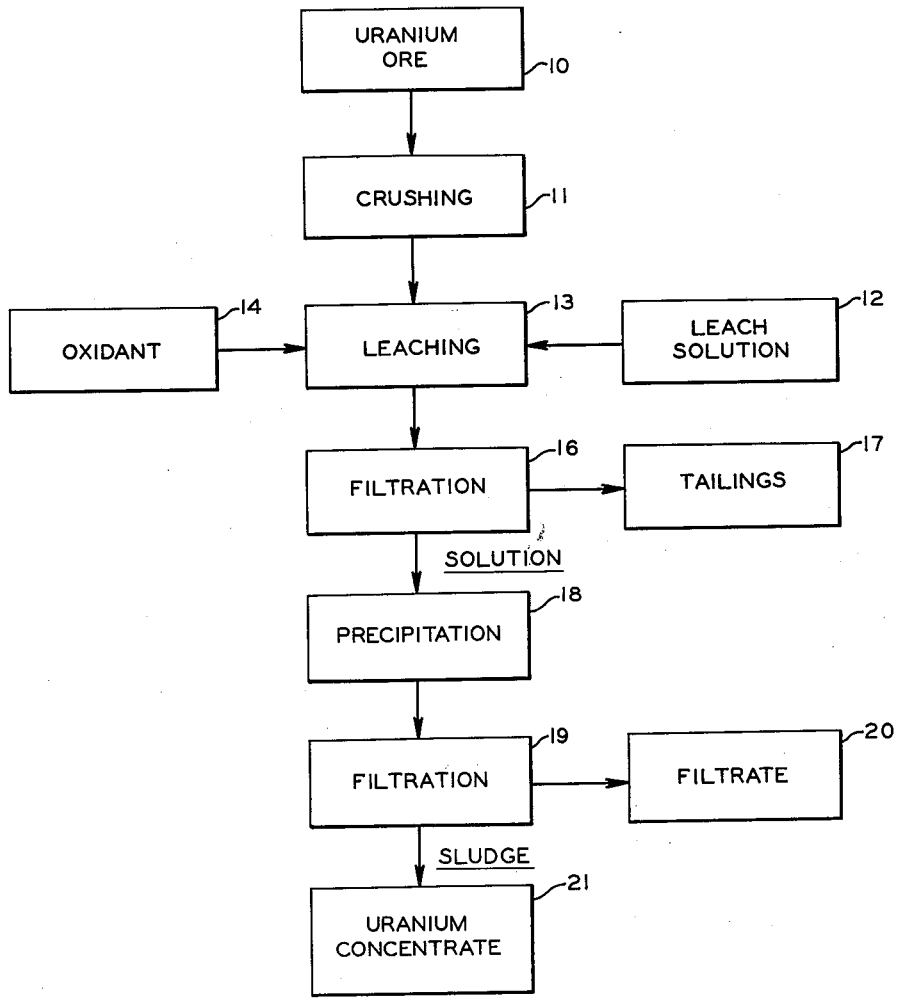
Figure 1 is a block flow diagram of the uranium concentration process.

The over-all process will be described by referring to Figure 1 which is a simplified block flow diagram showing uranium ore 10 which is passed to the ore crushing step 11, mentioned above. When vandium is present in the ore and recovery is desired, the conditioning includes a sodium chloride roast to insure complete recovery of vanadium compounds in the leach liquors. It is common to pulverize the ore to 30 mesh or less in a grinding step, not shown, prior to or during the first step of leaching. The ore thus conditioned is contacted with leach solution 12 in leaching step 13, or initially in the grinding step.

The type of leach solution employed depends, in large measure, upon the content of the ore. Those ores high in silica content are preferably leached with acid solutions such as sulfuric acid or hydrochloric acid. High lime ores, on the other hand, are processed by treatment with alkaline leach which is preferably a mixture of sodium carbonate and sodium bicarbonate in aqueous solution. In the carbonate leach the uranium is solubilized as sodium uranyl tricarbonate, $Na_4UO_2(CO_3)_3$. The solution has a pH of about 10 and a uranium concentration of about 0.3 to 2 grams of uranium per liter. The carbonate leach has an advantage over the acid leach in that it is generally more selective, and thus the concentration of unwanted elements in the solution is much lower. Also, corrosion and filtering problems are less troublesome with the carbonate leach.

Compounds of hexavalent uranium are much more soluble in aqueous solutions than are those of tetravalent uranium, and therefore, when treating ores containing an appreciable amount of uranium in the lower valence state, it is desirable to add oxidant 14 in the leaching step. In the process of my invention the oxidant is a gaseous mixture which comprises at least about 0.5 volume percent of ozone, preferably between 1 to 3 and not over 4 volume percent ozone, and at least 15 volume percent oxygen, preferably at least about 20 volume percent oxygen, with the remainder, if any, inert gas, generally nitrogen.

The solution slurry formed in the leaching operation is filtered in filtration step 16 to remove the insoluble components as tailings 17 while the solution containing dissolved uranium compound is subsequently treated for uranium separation, as by precipitation, in step 18. Other means of recovery, such as ion exchange or solvent extraction, can be employed. In the treatment of alkaline leach liquors, since the amount of impurities which are solubilized is generally quite low, a relatively high purity uranium concentrate can be formed by direct precipitation.

Precipitation is effected by changing the pH of the sodium carbonate solution by neutralizing with sulfuric acid to a pH of about 3 to 5. When vanadium is present, the quantitative precipitation of uranium is obtained as sodium uranyl vanadate which can be further refined to form $U_3O_8$. Uranium can also be precipitated as sodium polyuranate by the addition of caustic in excess of that required to neutralize the bicarbonate ion. The uranium precipitates can then be leached with a hot caustic solution to dissolve phosphates and impurities, such as alumina, silica and vanadium, without affecting the uranium. Other recovery methods of uranium from the leach liquors are well known.

Upon precipitation of the uranium compound, a second filtration step 19 is employed to separate the filtrate 20 from the uranium precipitate or sludge which is subsequently processed to form the specification grade uranium concentrate 21. As explained above, the precipitation steps can be replaced with the ion exchange techniques or solvent extraction, and it should be understood that these recovery techniques, as well as those of direct precipitation, can be employed advantageously in conjunction with the leaching step of my invention to obtain uranium concentrates.

Figure 2:
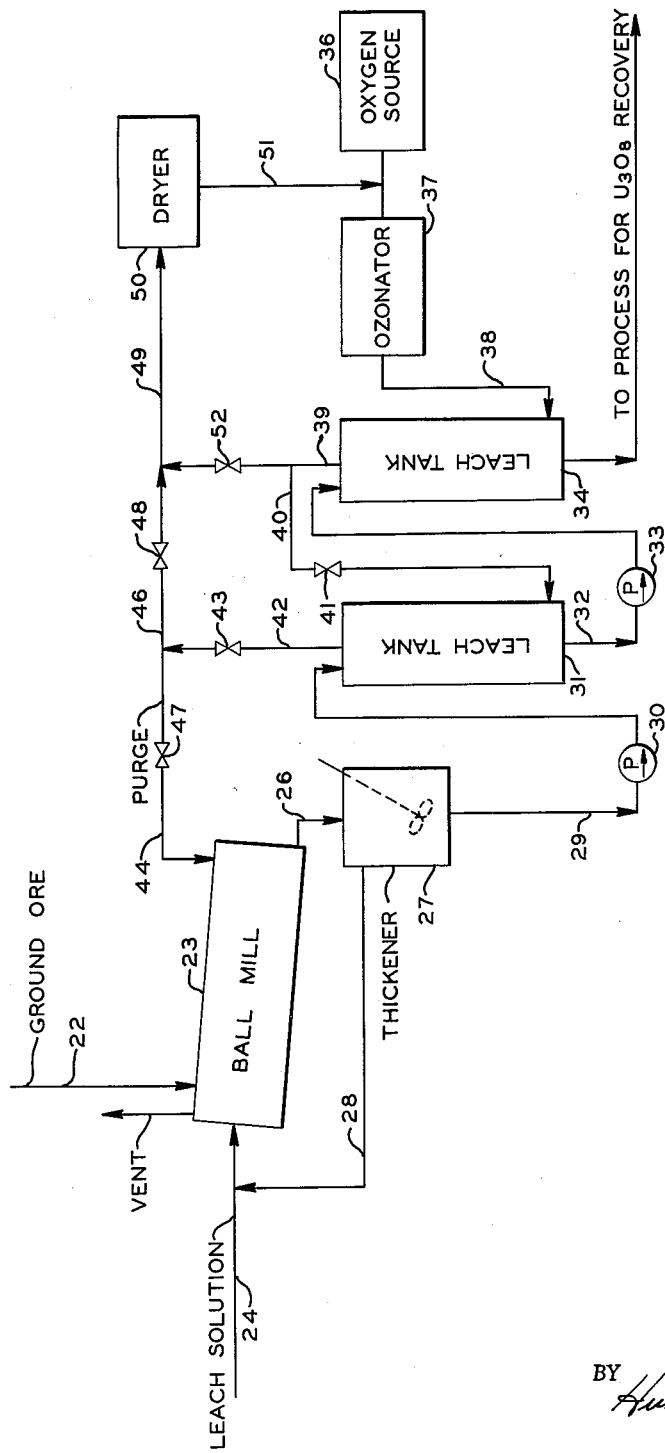
Figure 2 is a schematic flow diagram of the leaching operation employing an oxygen-ozone mixture as the oxidant.

In further description of the leaching operation according to my invention, reference is now made to Figure 2 which shows ground ore 22 entering ball mill 23 with leach solution 24. The ore is further pulverized in the ball mill and forms a slurry in the leach solution which passes by line 26 to thickening tank 27. The thickening tank is provided with agitation means in its lower portion to maintain the ore in suspension but is sized to permit the slurry to settle and enable decantation of clear liquor through line 28 and return thereof to the ball mill with fresh leach solution.

The thickened slurry thus formed passes by line 29 and pump 30 to leach tank 31. Slurry from leach tank 31 passes by line 32 and pump 33 to a second leach tank 34. While only two leach tanks have been shown in this drawing to illustrate countercurrent flow, it is to be understood that any number of such tanks can be arranged in series to provide the necessary reaction time for dissolution of uranium in the leach liquor.

High purity oxygen from source 36 is passed through ozonator 37 which commonly uses an electric arc method for generating ozone. An equilibrium amount of ozone of about 1 to 3 volume percent is formed in the oxygen stream. The ozone-oxygen mixture then passes through line 38 to leach tank 34, passing countercurrently to the flow of slurry. The gaseous mixture is dispersed in the lower portion of leach tank 34 and rises through the solution to the top of the tank from which it is drawn through line 39 and passed through line 40 and valve 41 to leach tank 31. The gaseous mixture, upon leaving tank 34, is substantially depleted in ozone and therefore has less oxidizing strength. This mixture contacts the fresh slurry in tank 31 where reaction with the more easily oxidizable materials takes place.

Gas withdrawn from tank 31 through line 42 and valve 43 is depleted in ozone and has picked up substantial amounts of impurities, particularly nitrogen, from dissolved air in the leach solution. It is therefore desirable to purge a quantity of this gas stream to prevent the build-up of nitrogen in the system. Accordingly, the gas stream from line 42 is split to purge line 44 and recycle line 46 by balancing valves 47 and 48 in lines 44 and 46, respectively.

To utilize the remaining oxidizing power in the purge stream, it is desirable to pass the purge gases through ball mill 23 wherein the initial contact is made with the ore slurry. Recycled oxygen is passed through lines 46 and 49 to dryer 50 and is returned through line 51 to the ozonator. If additional repurification of the oxygen in the recycle stream is required, this can be provided by separate means or by routing to the oxygen plant in installations where oxygen is manufactured at the site. In such a case the purge stream would not be necessary.

Alternative flow arrangements are available with the setup shown in Figure 2 by which the oxidant stream withdrawn from leach tank 34 can be passed through valve 52 and recycled directly to the dryer, allowing the entire purge stream to pass through tank 31 and thence to ball mill 23. Also, recycle streams can be drawn from both the exhaust streams of tanks 31 and 34. In an alternative arrangement, not shown, the oxidizing gas passes through both leach tanks 31 and 34 in parallel.

Figure 3:
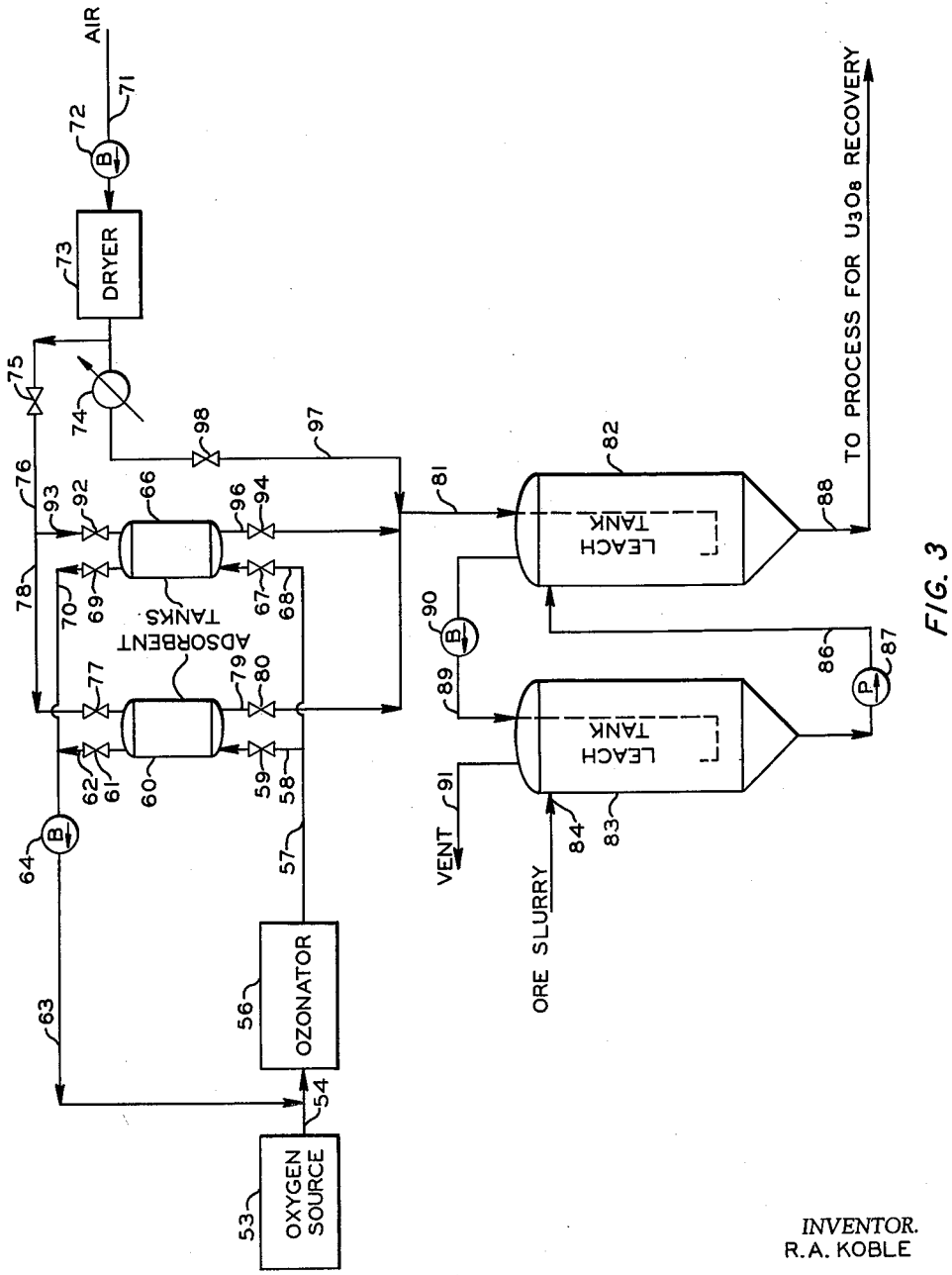
Figure 3 is a schematic flow diagram of the same process adapted to employ an air-ozone mixture as the oxidant.

The repurification of recycle oxygen is obviated in the embodiment of Figure 3, and, in addition, higher concentrations of ozone in the oxidant gas mixture are possible. It is preferred, however, for safety reasons to maintain the ozone concentration in the oxidizing gas stream under 4 volume percent. Referring to Figure 3, oxygen from source 53 is passed through line 54 to ozonator 56 which generates from 1 to 3 percent ozone in the oxygen stream. This mixture is then passed by line 57 through line 58 and valve 59 to adsorber tank 60 which contains a suitable ozone adsorbent such as silica gel, alumina gel, or the like. Oxygen passes from adsorber tank 60 through valve 61 and line 62 and is recycled through line 63 by blower 64 to ozonator 56. This oxygen recycle stream requires no repurification before returning to the ozonator.

When the adsorbent becomes saturated with ozone, the ozone-oxygen stream in line 57 is passed to adsorbent tank 66 by closing valve 59 in line 58 and opening valve 67 in line 68. The recycle oxygen stream then passes through valve 69 and line 70 to blower 64, valve 61 in line 62 being closed.

Air in line 71 is passed by blower 72 through drier 73. Part of the dry air stream passes through valve 75 in line 76 on its way to one of the adsorbent tanks to pick up ozone. While the ozone-oxygen stream is passing through the adsorbent in tank 66, the dry air stream in line 76 is routed through valve 77 in line 78 into adsorbent tank 60. This air strips ozone from the adsorbent and the ozone-enriched air stream passes through line 79 and valve 80 into line 81 which feeds into leach tank 82. The remainder of the air from drier 73 passes through heat exchanger 74 where it is heated to about 200° F. This hot air stream passes through line 97 and valve 98 and mixes with the air-ozone stream in line 81 prior to passing into the leach tanks. Valves 75 and 98 in lines 76 and 97, respectively, can be balanced to provide any desired ratio of air streams through the two lines. In an alternate, and in some instances preferred operation the entire air stream is passed to the adsorbent tank and the leach solution is heated by separate means, not shown. In order to avoid premature decomposition of the ozone as much as possible before addition to the leach solution it is desirable to keep the temperature of the desorbing air in line 76 relatively low, even cooling if necessary, and to delay mixing the ozone-air stream with the heated air until immediately before entry into the leach tanks.

Ore slurry or "pulp," as described in regard to Figure 2, enters leach tank 83 through line 84 and is passed to tank 82 through line 86 by pump 87. The ozone-enriched air stream contacts the ore slurry in tank 82 in countercurrent flow. As the air passes upwardly through the slurry, the oxygen and ozone contact the tetravalent uranium and oxidizable matter present in the pulp and the oxidized ore slurry passes from the leaching operation through line 88 to further steps for recovery of uranium oxide concentrate. Air and ozone which is not consumed in tank 82 passes through line 89 and is forced by blower 90 into tank 83 where the fresh slurry is initially contacted with the oxidizing gas stream in countercurrent flow. Air is vented from tank 83 through line 91.

The vented air stream is substantially depleted in ozone, and generally from 10 to 20 percent of the oxygen in the air is consumed in oxidizing the ore. When the adsorbent in tank 60 is stripped of its ozone, the dry air stream is switched to tank 66 by opening valve 92 in line 93 and valve 94 in line 96, and closing valves 77 and 80 in lines 78 and 79, respectively. The ozone-oxygen stream is then switched back to tank 60 by opening and closing the appropriate valves.

As was pointed out in regard to Figure 2, several leach tanks or pachucas can be arranged in series to provide the required reaction time which, when practicing my invention, can vary considerably but is usually in the range of about 20 to 40 hours. The size and number of pachucas is, of course, dependent upon the capacity of the installation. Generally, pulps containing about 40 to 60 percent solids are processed in the carbonate leach operation with air rates of about 3000 to 5000 standard cubic feet per ton of ore fed to the reactors. Improvements in extraction, which result in reduced leach time, can be obtained by using an ozone-enriched stream to oxidize the ore. From about 0.1 to 10 pounds of ozone per ton of ore can be employed with improved results, and the ozone employed is preferably in the range of about 0.25 to 3 pounds of ozone per ton of ore. When using a pure oxygen-gas stream which is enriched with ozone as shown in Figure 2, the total gas stream can be reduced considerably since nitrogen does not dilute the oxidizing gas, as in the case when air is used. It will ordinarily be preferred to employ an excess of oxygen over that required to effect the required oxidation in order to obtain agitation of the slurry and efficient distribution of the oxidizing gas throughout the liquid media. The excess oxygen is recycled for reuse in the system while only that amount necessary to prevent nitrogen from building up in the gas stream is purged.

In further description of my invention the following examples are presented. The reactants and their proportions and other specific conditions are presented in these examples as being typical and should not be construed to limit the invention unduly.

*Example I*

An ore pulp containing about 50 percent solids in a carbonate leach solution is passed to a pachuca installation at the rate of 60 tons of uranium ore per hour. The ore is pulverized so that 70 percent is less than 200 mesh. The carbonate leach solution contains 50 grams of sodium carbonate per liter and 15 grams of sodium bicarbonate per liter. The ore analysis is 0.2 weight percent uranium as $U_3O_8$. The pachucas are operated at 190° F., atmospheric pressure at the top and a bottom pressure of 50 pounds per square inch absolute. Air is passed countercurrently through the slurry at a rate of 4000 standard cubic feet per minute. The leach time required for complete oxidation of tetravalent uranium to the hexavalent state and oxidation of organic matter is 60 hours.

*Example II*

An ore pulp in carbonate leach, as described in Example I, is contacted continuously with a countercurrent stream of oxidizing gas of oxygen containing 1.0 volume percent ozone. The gas rate to the installation is 100 standard cubic feet per minute. Oxygen is recycled at the rate of 50 s.c.f.m. The recycled oxygen is purified and combined with fresh oxygen and passed continuously through an ozonator to form the oxidizing gas stream containing 1 percent ozone. The total leaching time required to obtain a degree of oxidation comparable to that obtained in Example I is 36 hours.

*Example III*

A uranium ore pulp containing 50 percent solids having a particle size of 70 percent less than 200 mesh in a carbonate leach solution containing 40 grams of sodium carbonate per liter and 20 grams of sodium bicarbonate per liter is passed continuously to a pachuca installation at the rate of 60 tons of ore per hour. The operating conditions are as in Example I. Ozone is adsorbed on silica gel at 30° F. from an ozone-oxygen gas stream and stripped from the adsorbent by dry air at 60° F., which is mixed with air heated to 150° F., to form a stream of air containing 2.0 volume percent ozone. The pulp is contacted countercurrently with the air-ozone gas at a rate of 3000 s.c.f.m. and the leach time is in the range of 26 to 30 hours.

*Example IV*

The ore pulp of Example III is contacted with an air stream containing 0.5 volume percent ozone with an air rate of 4000 s.c.f.m. for a leach time of 36 hours.

As illustrated in the above examples, a novel method of oxidizing uranium ore slurries is provided by my invention which has advantages in both economy and ease of control over prior art methods. Leaching times can be considerably reduced over operations which employ air alone as the oxidizing medium yet the advantages of a single oxidizing gas stream are retained.

As will be evident to those skilled in the art, various modifications of this invention can be made, or followed, in the light of the foregoing disclosure and discussion, without departing from the spirit or scope thereof.

I claim:

1. In a continuous process for leaching uranium from uranium ore by forming a leach solution, pulverizing said uranium ore, forming a slurry of the pulverized ore in said solution, and passing said slurry through a series of leaching tanks, the improved method of increasing the solubility of said uranium in the leach solution which comprises passing oxygen through an ozonator thereby forming an ozone-oxygen gas stream, passing said gas stream countercurrently to said slurry through said leaching tanks thereby increasing the solubility of uranium in said leach solution, removing the unreacted oxygen in a vent gas stream, purging a portion of said vent gas to said slurry forming step, drying the remainder of said vent gas, and recycling the dried vent gas to said ozonator.

2. A process according to claim 1 wherein said solution is a carbonate leach solution.

3. A process according to claim 1 wherein said solution is an acid leach solution.

4. In a continuous process for leaching uranium from uranium ore by forming a leach solution, pulverizing said uranium ore, forming a slurry of the pulverized ore in said solution, and passing said slurry through a series of leaching tanks, the improved method of increasing the solubility of said uranium in the leach solution which comprises passing oxygen through an ozonator thereby forming a first ozone-oxygen gas stream, contacting said first gas stream with an ozone adsorbent thereby adsorbing ozone on said adsorbent, recirculating the remaining oxygen from said first gas stream to said ozonator, stripping ozone from said adsorbent with an oxygen containing gas stream thereby forming a second ozone-oxygen containing gas stream, passing said second gas stream countercurrently to said slurry through said leaching tanks, thereby increasing the solubility of uranium in said leach solution, and venting the ozone depleted gas stream.

5. A process according to claim 4 wherein said oxygen containing gas stream is air.

6. A process according to claim 4 wherein said adsorbent is silica gel.

7. In a uranium concentration process wherein uranium ore is pulverized and treated with an aqueous leach solution of sodium carbonate and sodium bicarbonate to dissolve uranium from said ore, the improved method of increasing the solubility of said uranium in said leach solution which comprises passing oxygen through an ozonator to form a first gas stream of ozone and oxygen, contacting said first gas stream with silica gel, thereby adsorbing ozone on said silica gel, recycling oxygen from said first gas stream to said ozonator, stripping ozone from said silica gel with an air stream thus forming a second gas stream of air containing from 0.5 to 4 volume percent ozone, passing said second gas stream through a slurry of said ore in said leach solution in continuous countercurrent flow thereby contacting said ore with said ozone and the oxygen in the air, oxidizing tetravalent uranium to hexavalent uranium and forming an exhaust gas stream depleted in ozone, and venting said exhaust gas stream.

8. In a uranium concentration process wherein uranium ore is pulverized and treated with an aqueous leach solution of sodium carbonate and sodium bicarbonate to dissolve uranium from said ore, the improved method of increasing the solubility of said uranium in said leach solution which comprises passing oxygen through an ozonator to form a first gas stream of ozone and oxygen, contacting said first gas stream with silica gel in a first adsorption zone, thereby adsorbing ozone on said silica gel, recycling oxygen from said first gas stream to said ozonator, rerouting said first gas stream to a second adsorption zone containing silica gel by-passing said first adsorption zone, stripping ozone from said silica gel in said first adsorption zone with an air stream thus forming a second gas stream of air containing 1 to 3 volume percent ozone while adsorbing ozone on silica gel in said second adsorption zone, said second gas stream containing a higher concentration of ozone than said first gas stream, passing said second gas stream through a slurry of said ore in said leach solution in continuous countercurrent flow thereby contacting said ore with said ozone and the oxygen in the air, oxidizing tetravalent uranium to hexavalent uranium and forming an exhaust gas stream depleted in ozone, and venting said exhaust gas stream.

9. In a continuous process for concentrating uranium oxide from uranium ore by crushing said ore to a small particle size, pulverizing said ore to a still smaller particle size less than 30 mesh in the presence of a carbonate leach solution, thereby forming an ore slurry, thickening said slurry by settling, passing said slurry through a series of leach tanks, separating the insoluble ore components from the leach solution containing dissolved uranium salt, precipitating uranium compound from said leach solution, and recovering the uranium thus concentrated as uranium oxide, the improved method of increasing the solubility of said uranium in said leach solution which comprises passing an oxygen stream through an ozonator to form a first gas stream containing about 1 to 3 volume percent ozone, contacting said slurry in said leach tanks with said first gas stream in continuous countercurrent flow, thereby forming soluble uranyl carbonate and an exhaust gas stream depleted in ozone and containing a substantial amount of nitrogen, dividing said exhaust gas stream into a purge stream and a recycle stream, passing said purge stream to said pulverizing step, drying said recycle stream, and recirculating said recycle stream thus dried through said ozonator with said oxygen stream.

References Cited in the file of this patent

UNITED STATES PATENTS

| | | |
|---|---|---|
| 1,957,182 | Schaus | May 11, 1934 |
| 2,597,504 | Larsson | May 20, 1952 |
| 2,730,556 | Liedholm | Jan. 10, 1956 |

FOREIGN PATENTS

| | | |
|---|---|---|
| 517,198 | Canada | Oct. 4, 1955 |

OTHER REFERENCES

Schubert et al.: Oxidation of Uranium Oxide with Ozone, abstracted in vol. 659, page 589, Official Gazette, June 10, 1952.

Griffith et al.: WIN–45, Apr. 5, 1956, pp. 7, 8, 10 and 11. (Copy in Div. 46.)

Kirk and Othmer: Encyclopedia of Chemical Technology (1947), vol. 1, pp. 226–231. (Copy in Scientific Library.)

Marvin et al.: Proceedings of the International Conference on the Peaceful Uses of Atomic Energy, vol. 8, pp. 3–7, Aug. 8–20, 1955. (Copy in Scientific Library.)

Hann: Chemical Engineering Progress, vol. 51, No. 11, November 1955, pp. 523–527. (Copy in Scientific Library.)